United States Patent
Chen et al.

(10) Patent No.: US 11,422,351 B2
(45) Date of Patent: *Aug. 23, 2022

(54) REAL-TIME AUTOFOCUS SCANNING

(71) Applicant: LEICA BIOSYSTEMS IMAGING, INC., Vista, CA (US)

(72) Inventors: Leng-Chun Chen, Vista, CA (US); Allen Olson, San Diego, CA (US); Yunlu Zou, San Diego, CA (US); Peyman Najmabadi, San Diego, CA (US); Greg Crandall, San Marcos, CA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,251

(22) Filed: Nov. 25, 2020

(65) Prior Publication Data

US 2021/0103134 A1    Apr. 8, 2021

Related U.S. Application Data

(63) Continuation of application No. 16/674,742, filed on Nov. 5, 2019, now Pat. No. 10,852,523, which is a
(Continued)

(51) Int. Cl.
*G02B 21/00* (2006.01)
*G02B 21/24* (2006.01)
(Continued)

(52) U.S. Cl.
CPC ......... *G02B 21/244* (2013.01); *G02B 21/006* (2013.01); *G02B 21/008* (2013.01);
(Continued)

(58) Field of Classification Search
CPC ................ G02B 21/244; G02B 21/006; G02B 21/0076; G02B 21/008; G06T 7/50;
(Continued)

(56) References Cited

U.S. PATENT DOCUMENTS 5,604,344 A    2/1997  Finarov
7,120,286 B2  10/2006  Yu et al.
(Continued)

FOREIGN PATENT DOCUMENTS

CA    3075288 A1    4/2019
CN    1176396 A     3/1998
(Continued)

OTHER PUBLICATIONS

Wu et al., "Realize SAR Image Self-focusing by Maximizing Contrast", Modern Radar, Dec. 31, 2002.
(Continued)

*Primary Examiner* — Paulos M Natnael
(74) *Attorney, Agent, or Firm* — Knobbe, Martens, Olson & Bear, LLP

(57) ABSTRACT

Real-time autofocus. In an embodiment, a scanning apparatus includes an imaging sensor, a focusing sensor, an objective lens, and processor(s) configured to analyze image data captured by the imaging and focusing sensors, and move the objective lens. Real-time autofocus during scanning of a sample is achieved by determining a true-Z value for the objective lens for a point on a sample and for each of a plurality of regions on the sample. The true-Z values and/or surfaces calculated therefrom are used to determine a predicted-Z value for an unscanned region of the sample. The objective lens is adjusted to the predicted-Z value at the beginning of the unscanned region. After scanning the region, a true-Z value is determined for the region and compared to the predicted-Z value. A rescan of the region is
(Continued)

initiated if the comparison exceeds a predetermined threshold.

20 Claims, 9 Drawing Sheets

Related U.S. Application Data continuation of application No. 16/147,465, filed on Sep. 28, 2018, now Pat. No. 10,481,377.

(60) Provisional application No. 62/566,155, filed on Sep. 29, 2017.

(51) Int. Cl.
  *G06T 7/50* (2017.01)
  *H04N 5/372* (2011.01)

(52) U.S. Cl.
  CPC ............ *G02B 21/0076* (2013.01); *G06T 7/50* (2017.01); *G06T 2207/10061* (2013.01); *G06T 2207/10064* (2013.01); *H04N 5/37206* (2013.01)

(58) Field of Classification Search
  CPC ........... G06T 2207/10061; G06T 2207/10064; H04N 5/37206
  See application file for complete search history.

(56) References Cited

U.S. PATENT DOCUMENTS

| | | | |
|---|---|---|---|
| 7,570,795 | B2 | 8/2009 | Yu et al. |
| 7,885,528 | B2 | 2/2011 | Chang et al. |
| 8,111,905 | B2 | 2/2012 | Campbell |
| 8,724,015 | B2 | 5/2014 | Yoshino |
| 9,041,791 | B2 | 5/2015 | Zahniser |
| 9,110,301 | B2 | 8/2015 | Lippert et al. |
| 9,239,454 | B2 | 1/2016 | Lippert et al. |
| 10,481,377 | B2 * | 11/2019 | Chen ..................... G02B 21/244 |
| 10,852,523 | B2 * | 12/2020 | Chen ......................... G06T 7/50 |
| 2005/0219518 | A1 | 10/2005 | Korngut et al. |
| 2009/0195688 | A1 | 8/2009 | Henderson et al. |
| 2010/0296727 | A1 | 11/2010 | Stern et al. |
| 2011/0115897 | A1 | 5/2011 | Najmadadi et al. |
| 2011/0249910 | A1 | 10/2011 | Henderson et al. |
| 2012/0099852 | A1 | 4/2012 | Staker et al. |
| 2014/0204196 | A1 | 7/2014 | Loney et al. |
| 2015/0130920 | A1 | 5/2015 | Zou et al. |
| 2016/0041380 | A1 | 2/2016 | Kuhn et al. |
| 2016/0080632 | A1 | 3/2016 | Iwase et al. |
| 2017/0323431 | A1 | 11/2017 | Sarkar et al. |
| 2018/0260609 | A1 | 9/2018 | Georgescu et al. |

FOREIGN PATENT DOCUMENTS

| | | |
|---|---|---|
| CN | 1595167 A | 3/2005 |
| CN | 101098407 A | 1/2008 |
| CN | 100442099 C | 12/2008 |
| CN | 101339347 A | 1/2009 |
| CN | 102460263 A | 5/2012 |
| CN | 102597842 A | 7/2012 |
| CN | 102782559 A | 11/2012 |
| CN | 103323939 A | 9/2013 |
| CN | 103460684 A | 12/2013 |
| CN | 103635848 A | 3/2014 |
| CN | 103765277 A | 4/2014 |
| CN | 104049351 A | 9/2014 |
| CN | 105093479 A | 11/2015 |
| CN | 105143953 A | 12/2015 |
| CN | 111183385 A | 5/2020 |
| JP | H11231228 A | 8/1999 |
| JP | 2011-090221 A | 5/2011 |
| JP | 6899963 B2 | 7/2021 |
| KR | 10-2020-0041982 A | 4/2020 |
| WO | WO 2008/007725 A1 | 1/2008 |
| WO | WO 2017/002458 A1 | 1/2017 |
| WO | WO 2017/053891 A1 | 3/2017 |
| WO | WO 2019/068043 A1 | 4/2019 |

OTHER PUBLICATIONS

Office Action in Canadian Application No. 3,075,288 dated Jun. 29, 2021, in 7 pages.
Office Action in Chinese Application No. 201880062657.7 dated Jul. 2, 2021, in 20 pages.
Office Action in Korean Application No. 10-2020-7008599 dated Jul. 30, 2021, in 5 pages.
International Search Report and Written Opinion issued in Interantional Application No. PCT/US2018/053637 dated Dec. 7, 2018 in 8 pages.

* cited by examiner

REAL-TIME AUTOFOCUS SCANNING

CROSS-REFERENCE TO RELATED APPLICATIONS

The present application is a continuation of U.S. patent application Ser. No. 16/674,742, filed on Nov. 5, 2019, which is a continuation of U.S. patent application Ser. No. 16/147,465, filed on Sep. 28, 2018, which claims priority to U.S. Provisional Patent App. No. 62/566,155, filed on Sep. 29, 2017, each of which is incorporated herein by reference as if set forth in full.

The present application is related to International Patent App. No. PCT/US2016/053581, filed on Sep. 23, 2016, and published as International Patent Pub. No. WO/2017/053891, which is incorporated herein by reference as if set forth in full.

BACKGROUND

Field of the Invention

The present disclosure generally relates to digital pathology, and more particularly relates to real-time autofocusing of a digital slide scanning apparatus.

Related Art

Digital pathology is an image-based information environment, which is enabled by computer technology that allows for the management of information generated from a physical slide. Digital pathology is enabled in part by virtual microscopy, which is the practice of scanning a specimen on a physical glass slide, and creating a digital slide image that can be stored, viewed, managed, and analyzed on a computer monitor. With the capability of imaging an entire glass slide, the field of digital pathology has exploded, and is currently regarded as one of the most promising avenues of diagnostic medicine in order to achieve even better, faster, and cheaper diagnosis, prognosis, and prediction of important diseases, such as cancer.

A primary objective for the digital pathology industry is to decrease the scanning time. Decreased scanning time can be achieved by switching over to real-time focusing during actual scanning. To achieve high-quality focused image data using real-time focus during actual scanning, the scanning device must be able to determine the next Z value (e.g., distance between the objective lens and specimen) for the objective lens. Therefore, what is needed is a system and method that overcomes these significant problems found in the conventional systems described above.

SUMMARY

In an embodiment, the scanning apparatus includes an imaging sensor, a focusing sensor, and a processor configured to analyze the image data captured by the imaging sensor and the focusing sensor. The position along the optical path of the individual pixels of the focusing sensor vary for each line of image data that is captured, and the position along the optical path of the individual pixels of the imaging sensor are all the same for each line of image data that is captured.

Initially, the processor may select a macro-focus point on the sample and scan a single field of view that includes the macro-focus point at a plurality of image planes, by changing the relative distance between the objective lens and the sample. This can be accomplished by moving the objective lens up and down in the optical path. The image data at each image plane is analyzed to determine the image plane with the highest contrast. The position of the objective lens that places the pixels of the imaging sensor at the highest-contrast image plane is referred to as "true-Z" and may also be referred to as a distance of the objective lens from the sample (e.g., a height of the objective lens), wherein the distance is relative to the range of possible positions of the objective lens along the optical path. After the true-Z value for the macro-focus point is determined, the greatest distance across the surface of the sample is determined and a series of regions are scanned along a line that spans that greatest distance across the sample.

Each region in the series of regions is preferably a contiguous set of fields of view of the imaging sensor and the focusing sensor across the sample. In an embodiment, a contiguous set of fields of view may include 1,000 fields of view, where each individual field of view represents a single scan line and the set of fields of view are referred to as a "buffer." The term "buffer" is not tied to any specific number of scan lines or any specific physical memory segment, and therefore, the size of a buffer can vary in accordance with, for example, physical memory segments or the speed of the scanning apparatus, where speed can be defined by stage speed or by image data capture speed.

In an embodiment, a plurality of reference buffers are scanned along a line representing the greatest distance across the sample, and a true-Z value is determined for each reference buffer by calculating a ratio of the contrast value from the focusing sensor and the contrast value from the imaging sensor for each pixel across all scan lines in the reference buffer, to determine an average contrast ratio vector for the reference buffer. The average contrast ratio vector includes the average contrast ratio value for each pixel column in the reference buffer. The average contrast ratio vector is then analyzed to determine a single peak contrast ratio value across all pixel columns, and the pixel location corresponding to the single peak contrast ratio value is converted into the true-Z value for the reference buffer.

In an embodiment, after the true-Z values for the macro-focus point and the plurality of reference buffers are determined, the imaging scan begins with a first stripe at one edge of the sample. The first stripe is separated into a plurality of image buffers for scanning. The closest true-Z value (in X-Y distance across the sample) amongst the macro-focus point, the plurality of reference buffers, and the image buffers is used when scanning each image buffer of the first stripe. Additionally, the processor begins to calculate a global sample surface using the true-Z values for the macro-focus point and the reference buffers and true-Z values that are calculated for each image buffer after scanning the respective image buffer. As additional stripes are scanned, the true-Z values for each image buffer is determined as described above and used to optimize the global surface.

In addition to the global surface, one or more local sample surfaces are also calculated using the true-Z values from nearby image buffers and reference buffers. In an embodiment, a local surface is limited to including true-Z values from nearby buffers that are within a 2 millimeter L-shaped region surrounding the next image buffer to be scanned. When scanning the next image buffer, the local surface is used (if available) to determine a predicted-Z value at which the objective lens is positioned at the beginning of scanning that next image buffer. In an embodiment, the slope of the local surface, the closest true-Z value amongst the macro-focus point, the plurality of reference buffers, the image buffers, and the distance (e.g., 1,000 lines=0.25 millimeter) to the start of the next image buffer are used to determine the predicted-Z value for the next image buffer. The objective lens is moved to the predicted-Z value, so that the objective lens is at the predicted-Z value when the first scan line of the next image buffer is scanned. After each image buffer is scanned, the true-Z value for the respective buffer is determined and the predicted-Z value used for the scan is compared to the true-Z value. In an embodiment, if the absolute value of the difference between the true-Z value and the predicted-Z value is greater than 0.9 microns, then the processor causes at least the respective image buffer to be rescanned by applying the restripe logic. Alternatively, the entire stripe or a plurality of image buffers surrounding the respective image buffer may be rescanned.

In an embodiment, a digital scanning apparatus is disclosed comprising: a focus sensor and an imaging sensor positioned in the optical path of an objective lens; a processor configured to adjust a height of the objective lens during scanning of a sample by: selecting a macro focus point on a sample, wherein the macro focus point is within a predetermined range of an edge of the sample and within the same predetermined range of a maximum length across the sample; scanning a single field of view of image data including the macro focus point at a plurality of image planes corresponding to a plurality of height positions of an objective lens; determining a contrast value for each of the plurality of image planes; identifying a first true-Z value (Z1) corresponding to an image plane having a highest contrast value; scanning a plurality of buffers of image data along the maximum length across the sample, wherein each buffer of image data comprises a plurality of scan lines and each scan line comprises a plurality of pixels such that each buffer comprises a number of rows of pixels equal to a number of the plurality of scan lines and a number of columns of pixels equal to a number of the plurality of pixels; determining a contrast ratio value for each buffer by: determining a contrast ratio value for each pixel in a selected buffer; determining an average contrast ratio value for each column of pixels in the selected buffer; and determining a contrast ratio value for the selected buffer based on the average contrast ratio value for each column of pixels in the selected buffer; identifying a plurality of additional true-Z values (Z2-Zn) corresponding to each contrast ratio value for each buffer; storing the true-Z values (Z1-Zn) with corresponding X-Y location information for the respective buffer or field of view including the macro focus point; determining an X-Y location of a next portion of the sample to be image scanned; identifying a nearest true-Z value based on a comparison of the determined X-Y location and the stored X-Y locations; adjusting the height position of the objective lens to arrive an image plane corresponding to the nearest true-Z value at a beginning position of the next portion of the sample to be image scanned. The process may be further configured to: determine a post Z value for a first portion of the sample, wherein the first portion of the sample was recently scanned at the true-Z value; compare the post Z value for the first portion of the sample to the true-Z value at which the first portion of the sample was scanned; initiate a rescan of the first portion of the sample if the difference between the post Z value and the true-Z value is greater than a predetermined value.

In an embodiment, a method is disclosed comprising: selecting a macro focus point on a sample, wherein the macro focus point is within a predetermined range of an edge of the sample and within the same predetermined range of a maximum length across the sample; scanning a single field of view of image data including the macro focus point at a plurality of image planes corresponding to a plurality of height positions of an objective lens; determining a contrast value for each of the plurality of image planes; identifying a first true-Z value (Z1) corresponding to an image plane having a highest contrast value; scanning a plurality of buffers of image data along the maximum length across the sample, wherein each buffer of image data comprises a plurality of scan lines and each scan line comprises a plurality of pixels such that each buffer comprises a number of rows of pixels equal to a number of the plurality of scan lines and a number of columns of pixels equal to a number of the plurality of pixels; determining a contrast ratio value for each buffer by: determining a contrast ratio value for each pixel in a selected buffer; determining an average contrast ratio value for each column of pixels in the selected buffer; and determining a contrast ratio value for the selected buffer based on the average contrast ratio value for each column of pixels in the selected buffer; identifying a plurality of additional true-Z values (Z2-Zn) corresponding to each contrast ratio value for each buffer; storing the true-Z values (Z1-Zn) with corresponding X-Y location information for the respective buffer or field of view including the macro focus point; determining an X-Y location of a next portion of the sample to be image scanned; identifying a nearest true-Z value based on a comparison of the determined X-Y location and the stored X-Y locations; adjusting the height position of the objective lens to arrive an image plane corresponding to the nearest true-Z value at a beginning position of the next portion of the sample to be image scanned. The method may further comprise: determining a post Z value for a first portion of the sample, wherein the first portion of the sample was recently scanned at the true-Z value; comparing the post Z value for the first portion of the sample to the true-Z value at which the first portion of the sample was scanned; initiating a rescan of the first portion of the sample if the difference between the post Z value and the true-Z value is greater than a predetermined value.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for a scanning workflow to implement real-time autofocus. For example, one method disclosed herein allows for initiating a real-time autofocus scan by determining a true-Z value for an objective lens at a macro-point on a sample, and determining a true-Z value for an objective lens for each of a plurality of reference buffers (i.e., contiguous regions) on the sample. The true-Z values are used to calculate a global and local surface of the sample. The true-Z values and surface(s) calculated therefrom are used to determine a predicted-Z value for an unscanned image buffer (i.e., contiguous region) of the sample. During scanning, the objective lens may be moved (e.g., up or down), so that it arrives at the predicted-Z value at the beginning (e.g., first scan line) of the unscanned image buffer. After scanning each image buffer, a true-Z value is determined for the respective image buffer and compared to the predicted-Z value for the respective image buffer. If the difference between the predicted-Z value and the true-Z value for the region exceeds a predetermined threshold, a rescan of the respective image buffer is initiated.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

In an embodiment, the digital scanning apparatus described herein may utilize the configuration of imaging and focusing sensors described in International Patent Pub. No. WO/2017/053891. For example, the imaging sensor 20 and the focusing sensor 30, described in International Patent Pub. No. WO/2017/053891, may be utilized as the imaging sensor and the focusing sensor, respectively, described herein.

Figure 1:
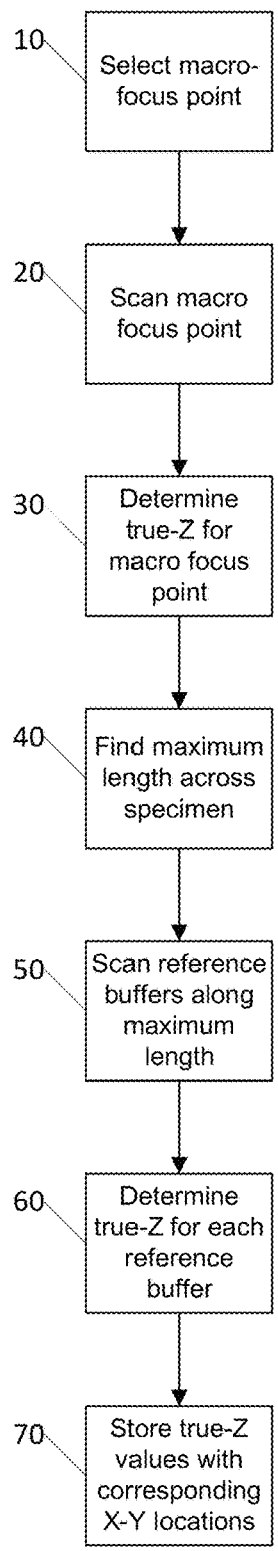
FIG. 1 is a flow diagram illustrating an example initialization process for real-time autofocus in a digital scanning apparatus, according to an embodiment.

FIG. 1 is a flow diagram illustrating an example initialization process for real-time autofocus in a digital scanning apparatus, according to an embodiment. The illustrated process can be carried out by a digital scanning apparatus system, such as those described with respect to FIGS. 5A-5D. Initially, in step 10, a location of a macro-focus point is selected. The location of the macro-focus point is preferably within a predetermined range of an edge of the sample, and is also preferably within the same predetermined range of the longest distance across the surface of the sample. In an embodiment, the predetermined range is determined by the perpendicular range of the focusing sensor with respect to the optical path.

Once the location of the macro-focus point is determined, a field of view of the sample that includes the macro-focus point is scanned at all available image planes, as shown in step 20. The universe of available image planes is determined by the set of possible relative distances between the objective lens and the sample. In a simple embodiment, focus adjustments are made by adjusting the position of the objective lens along the optical axis and therefore the available image planes are determined by the closest and farthest objective lens positions and the incremental objective lens positions in between these closest and farthest positions.

Next, in step 30, the true-Z value for the macro-focus point is determined. As previously discussed, a true-Z value represents a distance of the objective lens from the sample (also referred to herein as a "height," since the objective lens is usually positioned above the sample), wherein the distance is relative to the range of possible positions of the objective lens along the optical path. The true-Z value is determined by moving the objective lens up and down in the optical path to acquire image data for each of a plurality of image planes representing a focus depth. Alternatively, the image data for a plurality of image planes may be acquired simultaneously using a tilted focusing sensor. In either case, the image data at each image plane is analyzed to determine the image plane with the highest contrast. The position of the objective lens that places the highest-contrast image plane at the pixels of the imaging sensor is referred to as the true-Z value.

Next, in step 40, the maximum length across the sample is determined. This step may take place during the process of selecting the macro-focus point, so that the macro-focus point is within the predetermined distance of an edge of the sample and also within the predetermined distance of a line that represents the maximum length across the sample. Once a line that represents the maximum length across the sample is determined, then, in step 50, a plurality of reference buffers along the maximum length are scanned, and, in step 60, a true-Z value is calculated for each reference buffer. In an embodiment, the plurality of reference buffers form a complete contiguous region along the maximum length across the sample. In an alternative embodiment, the reference buffers along the maximum length across the sample may be wholly or partially disconnected from each other.

After each reference buffer is scanned, the true-Z value for the buffer is determined. As described above, in an embodiment, determining the true-Z value for a single field of view includes analyzing the raw intensity information that is provided by each pixel in the focusing sensor and the imaging sensor and calculating a contrast ratio value for each pixel. Because each pixel of the focusing sensor is at a different image plane with respect to the optical path, the respective image plane of the pixel having the highest contrast ratio value is determined to be the highest-contrast image plane, and accordingly, the objective lens height that would position all of the pixels of the imaging sensor on the highest-contrast image plane is determined to be the true-Z value for the macro-focus point.

A similar process is followed when determining the true-Z value for a buffer that includes a plurality of scan lines. For example, a buffer includes a plurality of scan lines, and each scan line has a plurality of pixels. For example, a buffer may have 4096 pixel columns, and the number of rows in the buffer is equal to the number of scan lines in the buffer. When determining the true-Z value for a buffer, the contrast ratio values in each pixel column are averaged to generate a vector of 4096 average contrast ratio values that correspond to the 4096 pixel columns in the buffer. The average contrast ratio vector is then analyzed in the same fashion as a single field of view to determine a true-Z value for the buffer. After the true-Z value has been determined for each reference buffer, the true-Z value along with X-Y location information for the buffer are stored in memory. It should be understood that the X-Y location information indicates the position of the buffer within the plane of the sample, slide, or stage.

Figure 2:
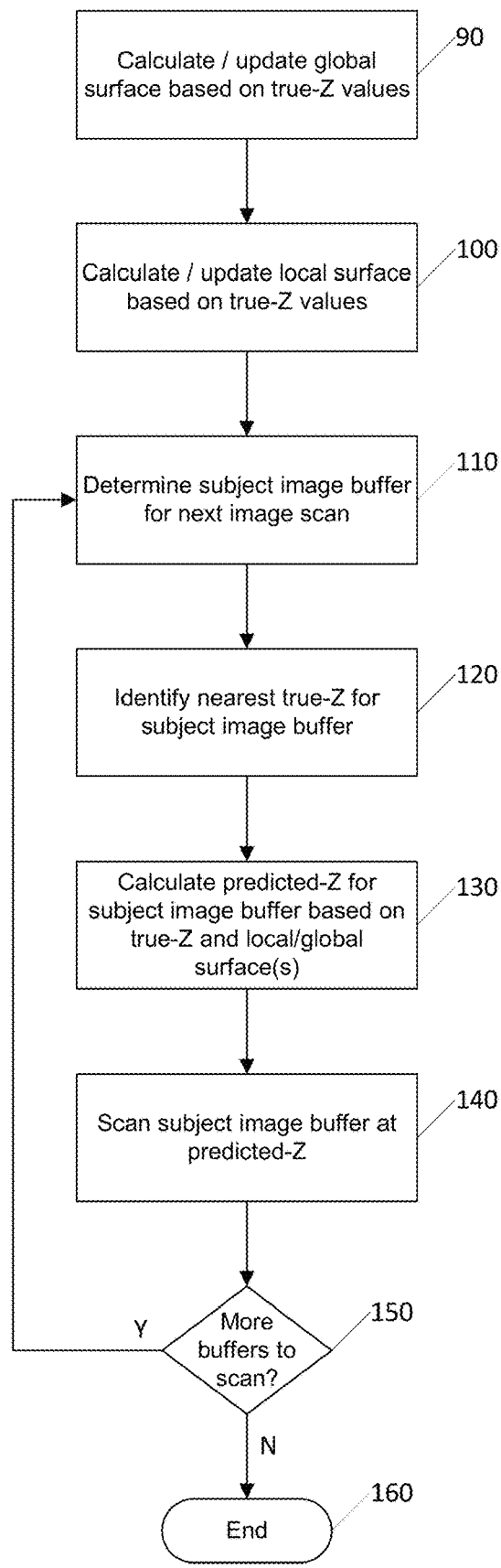
FIG. 2 is a flow diagram illustrating an example process for scanning a sample using real-time autofocus, according to an embodiment.

FIG. 2 is a flow diagram illustrating an example process for scanning a sample using real-time autofocus, according to an embodiment. The illustrated process can be carried out by a digital scanning apparatus system such as those described with respect to FIGS. 5A-5D. In steps 90 and 100, the global sample surface and the local sample surface are initially calculated and/or updated, as appropriate, based on the available true-Z values and their corresponding X-Y location information. The global sample surface is based on all available true-Z values, and the local surface is based only on nearby available true-Z values, where "nearby" is relative (e.g., adjacent) to the subject image buffer that is next to be scanned.

In step 110, the next image buffer to be scanned (referred to herein as the "subject image buffer") is determined. Then, in step 120, the nearest true-Z value in X-Y distance across the surface of the sample is identified for the subject image buffer. Next, in step 130, the predicted-Z value for the subject image buffer is calculated. In an embodiment, the predicted-Z value is equal to the nearest true-Z value. Alternatively, the predicted-Z value may be calculated based on the nearest true-Z value and information from a local surface that has been determined for the subject image buffer. As another alternative, the predicted-Z value may be calculated based on the nearest true-Z value and information from the global surface that has been determined for the sample. As yet another alternative, the predicted-Z value may be calculated based on the nearest true-Z value and information from a local surface that has been determined for the subject image buffer and information from the global surface that has been determined for the sample. Once the predicted-Z value has been calculated, in step 140, the subject image buffer is scanned with a starting objective lens height corresponding to the predicted-Z value. As determined in step 150, if there are more image buffers to be scanned for the sample (i.e., "Y" in step 150), the process loops back to step 110 where the next image buffer to be scanned is identified. If scanning of the sample is complete (i.e., "N" in step 150), the process ends as shown in step 160.

Figure 3:
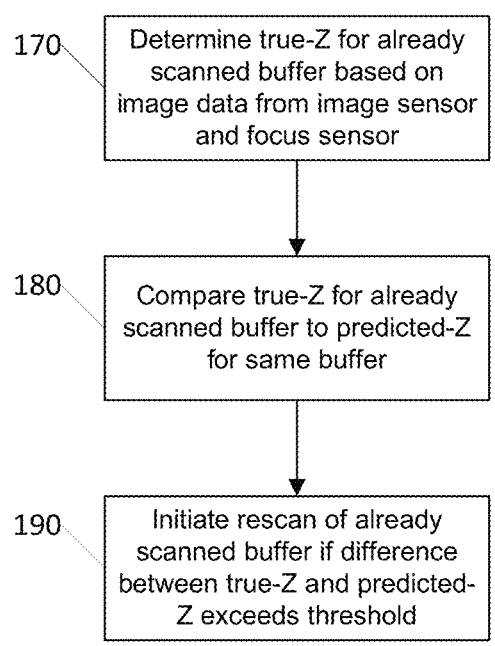
FIG. 3 is a flow diagram illustrating an example process for validating already scanned image data using real-time autofocus, according to an embodiment.

FIG. 3 is a flow diagram illustrating an example process for validating already scanned image data using real-time autofocus, according to an embodiment. The illustrated process can be carried out by a digital scanning apparatus system such as those described with respect to FIGS. 5A-5D. Initially, in step 170, after a first image buffer has been scanned, the image data for the first image buffer is analyzed to determine a true-Z value for the first image buffer. Next, in step 180, the true-Z value for the first image buffer is compared to the predicted-Z value for the first image buffer. If a difference between the true-Z value for the first image buffer and the predicted-Z value for the first image buffer exceeds a predetermined threshold, as shown in step 190, then the first image buffer is identified as needing to be rescanned. In an embodiment, if a certain percentage of image buffers across the entire sample are identified as needing to be rescanned, a rescan of the entire sample is initiated. Alternatively, rescan may be initiated for only those image buffers where the difference between the true-Z value and the predicted-Z value exceeds the predetermined threshold. In an embodiment, the predetermined threshold is 0.5 microns. In an alternative embodiment, the predetermined threshold is 0.9 microns.

FIGS. 4A-4F are block diagrams illustrating an example slide 200 with a sample 210 having a gap 220, to be used in describing a process for real-time autofocus, according to an embodiment. Starting with FIG. 4A, a slide 200 supporting a sample 210 is shown. In the illustrated embodiment, the sample 210 has a gap 220. When the sample 210 is image scanned, initially a macro-focus point 300 is selected. In an embodiment, the location of the selected macro-focus point 300 is within a certain range of an edge of the sample 210. This range is defined as a radius 310. Additionally, in this embodiment, the location of the selected macro-focus point 300 is within the same range (i.e., radius 310) of a line 320 that extends along the greatest length across the sample 320. Accordingly, the macro-focus point 300 is selected such that an edge of the sample 210 and a line 320 along the greatest length across the sample are both within a predetermined radius 310 from the macro-focus point 300. In an embodiment, the length of the radius 310 is determined by a range of the focusing sensor perpendicular to the optical path.

Once the macro-focus point 300 has been selected, a field of view including the macro-focus point 300 is scanned, and a true-Z value is determined for the macro-focus point 300. Next, a series of reference buffers 330 along the greatest length across the sample 320 are scanned and a true-Z value is determined for each of the reference buffers 330. Note that the reference buffers may be contiguous across the length of the specimen as shown, or they may alternatively be non-contiguous. The true-Z values and their corresponding X-Y location information for the macro-focus point 300 and each reference buffer 330 are stored in memory.

Turning to FIGS. 4B-4F, the entire sample 210 is image scanned. The image scan typically begins at a side of the sample 210. A first image buffer A is identified as the subject buffer to be scanned next and a predicted-Z value is determined for the subject image buffer A. In this example embodiment, no local surface is available for subject image buffer A, and therefore, the nearest true-Z value 400 (in this case the true-Z value for the macro-focus point 300) is determined to be the predicted-Z value for subject image buffer A. Alternatively, the predicted-Z value for subject image buffer A may be calculated based on the nearest true-Z value 400 and information regarding a global surface that is calculated based on all available true-Z values. Once the predicted-Z value is determined for the subject image buffer A, the height of the objective lens is adjusted to the predicted-Z value, the stage is positioned at a starting position for scanning the subject image buffer A, and then the stage is moved with respect to the objective lens to scan the subject image buffer A.

During scanning of the subject image buffer A, the predicted-Z value for the subject image buffer B is determined based on the nearest true-Z value 410, and the height of the objective lens is adjusted to the predicted-Z value for the subject image buffer B, such that the objective lens is at the corresponding height for the predicted-Z value when the first scan line of subject image buffer B is scanned by the image sensor. As previously described, the predicted-Z value may also be determined based on information regarding a local surface (e.g., information regarding image buffer A) and/or the global surface.

Subsequent to scanning the subject image buffer A, the true-Z value of the subject image buffer A is determined and the true-Z value of image buffer A is compared to the predicted-Z value of image buffer A. In an embodiment, if the difference between the true-Z value of the subject image buffer A and the predicted-Z value of the subject image buffer A exceeds a predetermined threshold, the subject image buffer A is targeted for rescan.

Figure 4A:
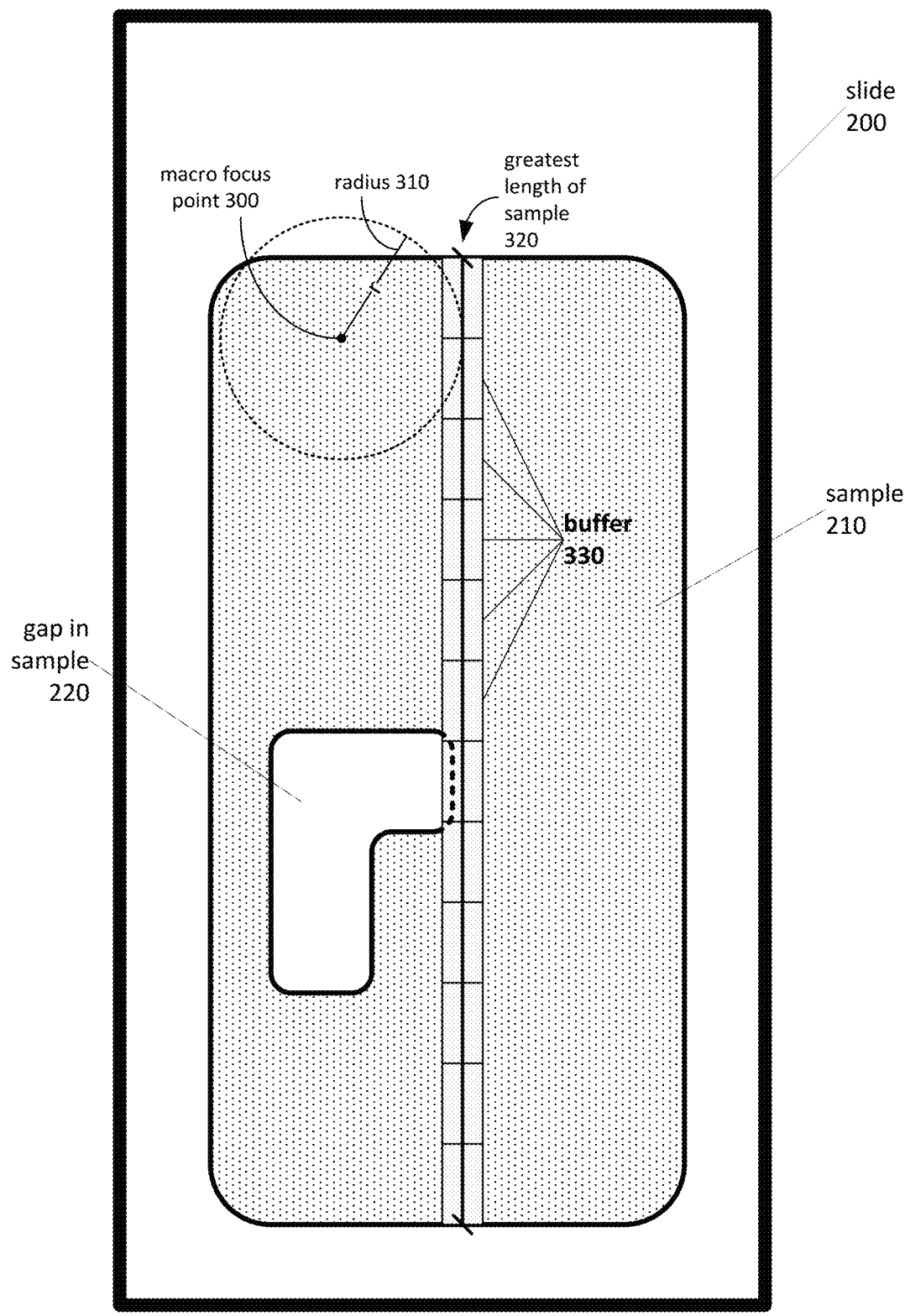
FIGS. 4A-4F are block diagrams illustrating an example slide with a sample and a process for real-time autofocus, according to an embodiment.
Figure 4B:
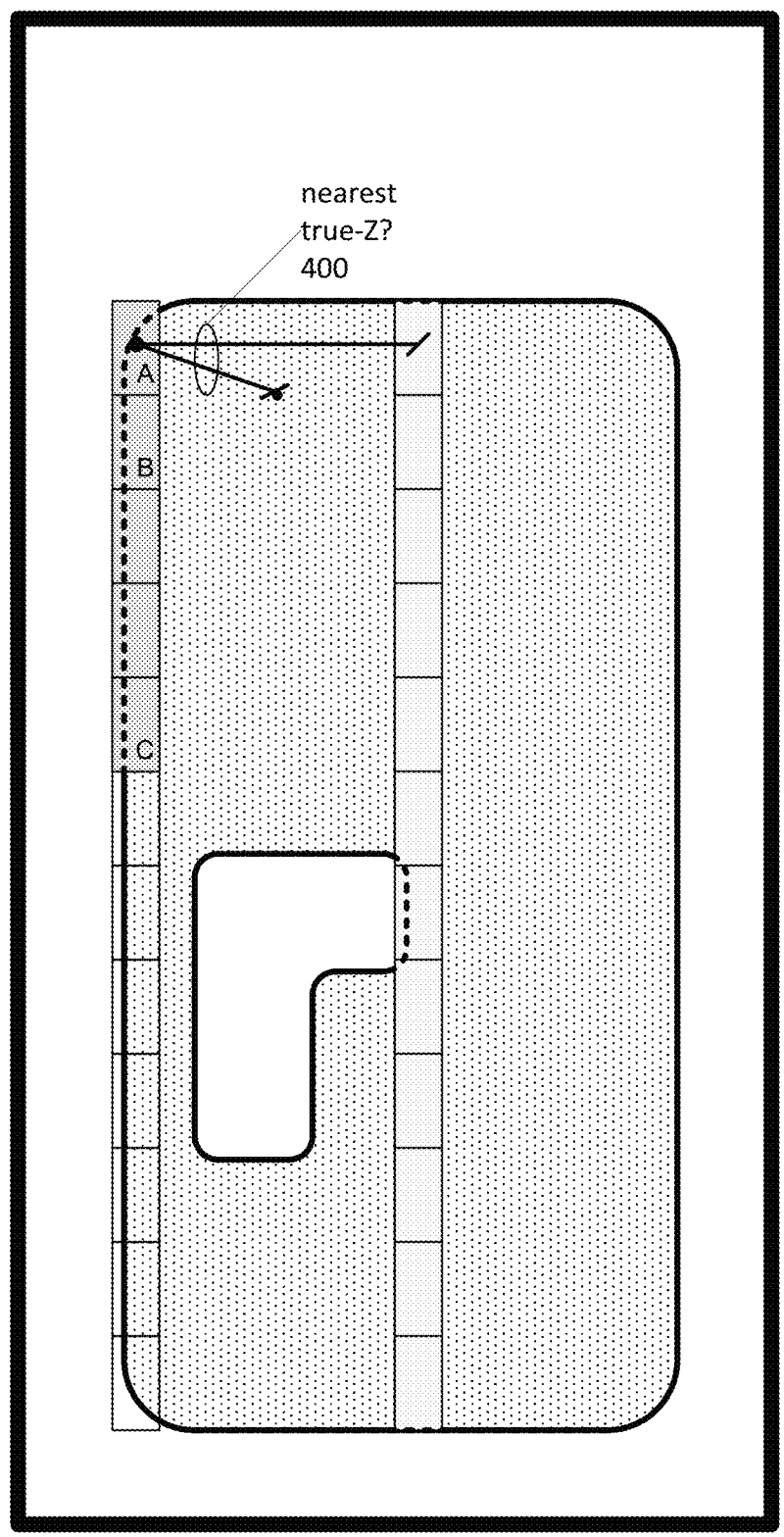
Figure 4C:
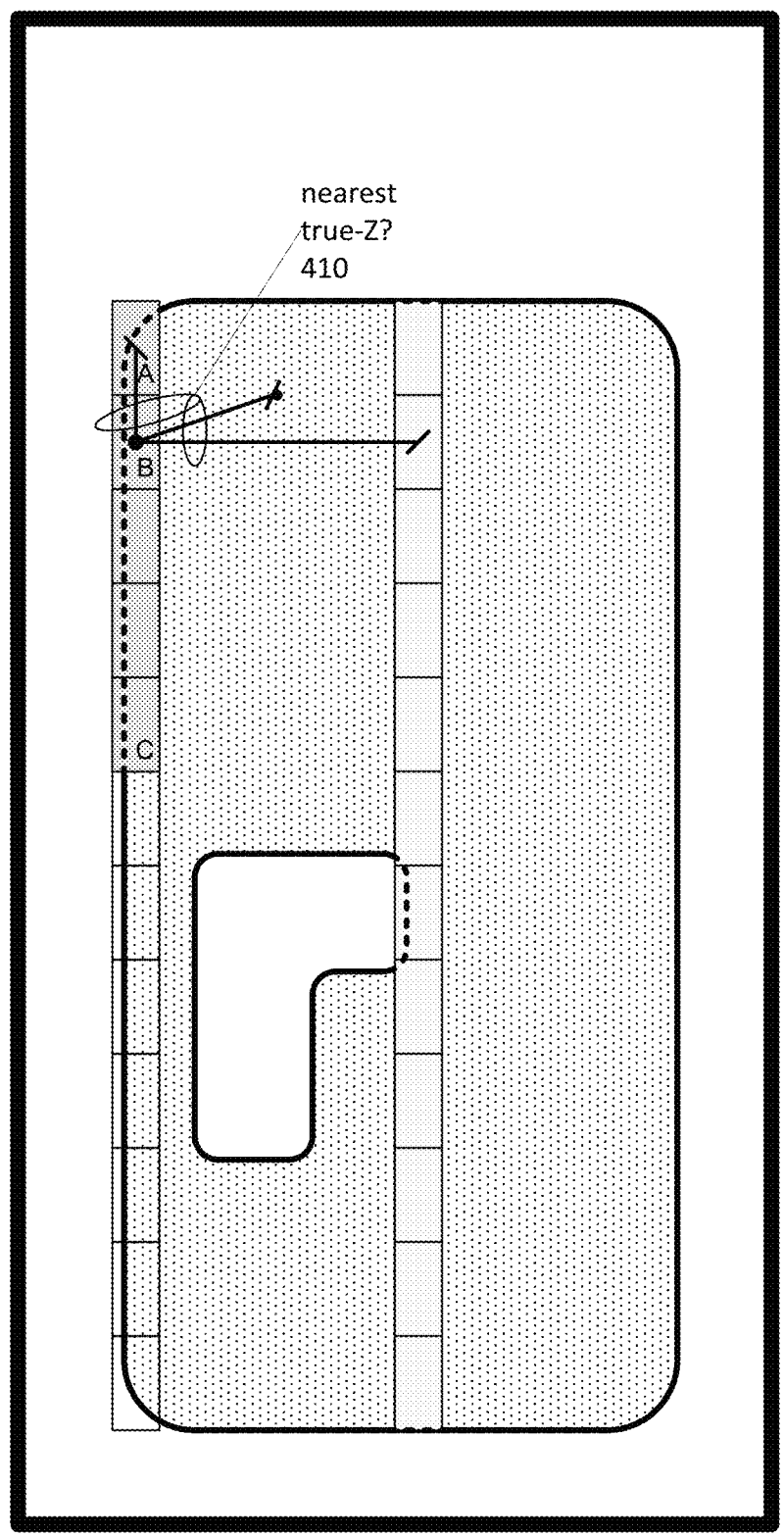
Figure 4D:
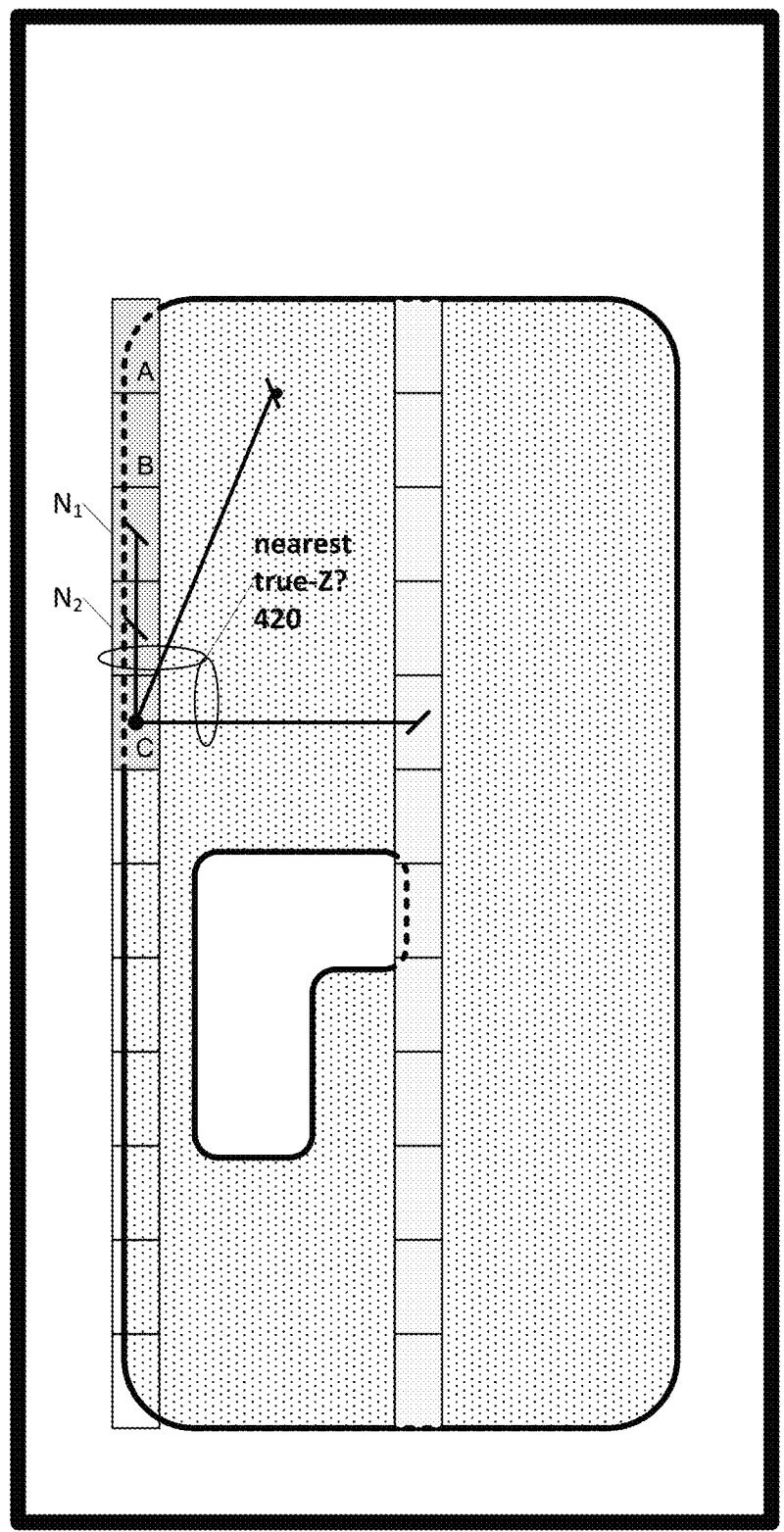

The scanning of image buffers continues in this fashion. Turning to FIG. 4D, the nearest true-Z value 420 for the subject image buffer C is the true-Z value of a previously scanned image buffer ($N_1$ or $N_2$), instead of the true-Z value of the macro-focus point 310 or any reference buffers 330. This is because the subject image buffer C is closer to the previously scanned image buffer ($N_1$ or $N_2$) than it is to the macro-focus point 310 or any reference buffer 330. In an embodiment, the true-Z value of previously scanned image buffer $N_1$ is used as the nearest true-Z value 420 for the subject image buffer C, because the image buffer $N_2$ is in the process of being scanned when the nearest true-Z value 420 value is being determined for the subject image buffer C. In an alternative embodiment, the true-Z value of previously scanned image buffer $N_2$ is used as the nearest true-Z value 420 for the subject image buffer C, because the subject image buffer C is closer to the image buffer $N_2$ than it is to the image buffer $N_1$.

Figure 4E:
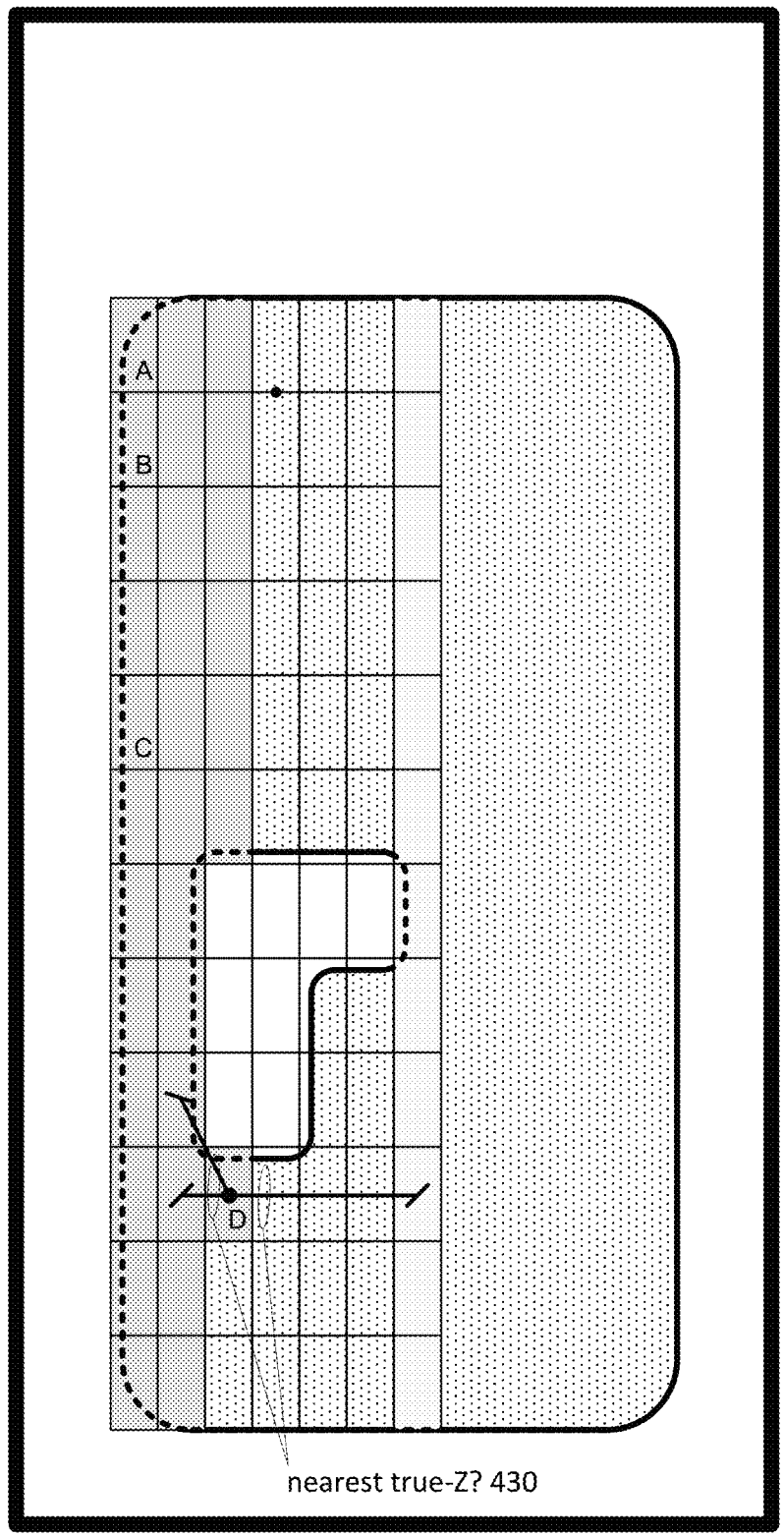
Figure 4F:
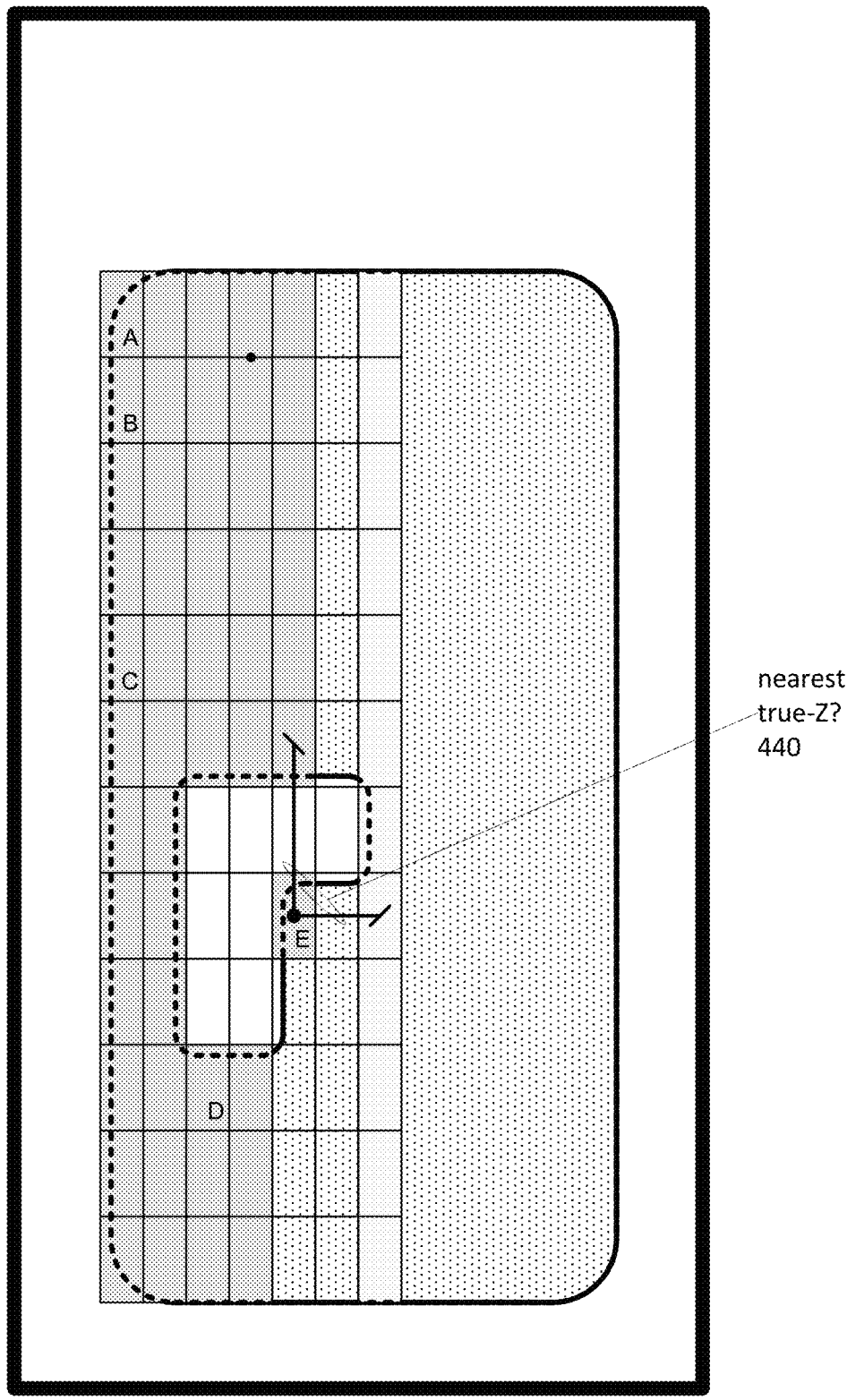

Similarly, turning to FIG. 4E, the nearest true-Z value 430 is the true-Z value of a previously scanned image buffer, instead of the true-Z value of the macro-focus point 310 or the true-Z value of a reference buffer 330, because the previously scanned image buffer is closer to the subject image buffer D. Turning to another example in FIG. 4F, the nearest true-Z value 440 of the subject image buffer E is the true-Z value of a reference buffer 330, instead of the true-Z value of the macro-focus point 310 or the true-Z value of a previously scanned buffer, because the subject image buffer E is closer to that particular reference buffer 330. As previously described, each predicted-Z value may be determined based on information regarding any single information or combination of information regarding a nearest Z value, a local surface, and a global surface.

Figure 5A:
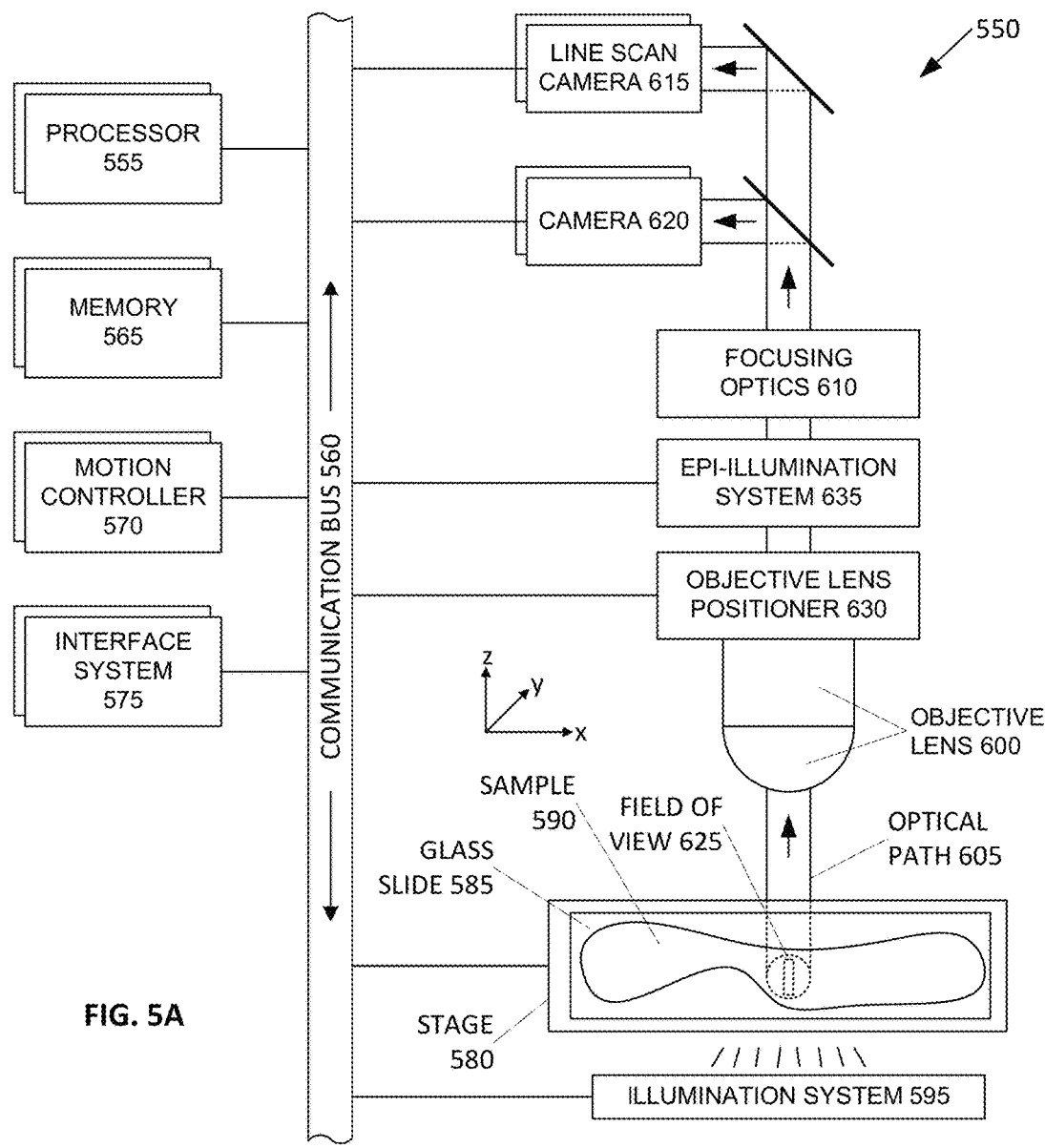
FIG. 5A is a block diagram illustrating an example processor-enabled device that may be used in connection with embodiments described herein.

FIG. 5A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a scanning apparatus, a digital scanning apparatus, a digital slide scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more additional cameras 620 (e.g., a line scan camera or an area scan camera), each of which define a separate field of view 625 on the sample 590 (e.g., corresponding to sample 210) and/or glass slide 585 (e.g., corresponding to slide 200). The various elements of the scanner system 550 are communicatively coupled via one or more communication busses 560. Although there may be one or more of each of the various elements of the scanner system 550, for the sake of simplicity, these elements will be described herein in the singular except when needed to be described in the plural to convey the appropriate information.

The one or more processors 555 may include, for example, a central processing unit (CPU) and a separate graphics processing unit (GPU) capable of processing instructions in parallel, or the one or more processors 555 may include a multicore processor capable of processing instructions in parallel. Additional separate processors may also be provided to control particular components or perform particular functions, such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, a removable storage drive, and/or the like. The processor 555 is configured to execute instructions that are stored in the memory 565 and communicate via communication bus 560 with the various elements of the scanner system 550 to carry out the overall function of the scanner system 550.

The one or more communication busses 560 may include a communication bus 560 that is configured to convey analog electrical signals, and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X, Y, and/or Z movement of the stage 580 (e.g., within an X-Y plane) and/or the objective lens 600 (e.g., along a Z axis orthogonal to the X-Y plane, via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown).

The illumination system 595 is configured to illuminate a portion of the sample 590. The illumination system may include, for example, a light source and illumination optics. The light source may comprise a variable intensity halogen light source with a concave reflective mirror to maximize light output and a KG-1 filter to suppress heat. The light source could also comprise any type of arc-lamp, laser, or other source of light. In an embodiment, the illumination system 595 illuminates the sample 590 in transmission mode such that the line scan camera 615 and/or camera 620 sense optical energy that is transmitted through the sample 590. Alternatively, or in combination, the illumination system 595 may also be configured to illuminate the sample 590 in reflection mode such that the line scan camera 615 and/or camera 620 sense optical energy that is reflected from the sample 590. The illumination system 595 may be configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon-sensitive molecules that can absorb light at a specific wavelength (excitation). These photon-sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10-bit 64-linear-array TDI line scan camera. It should be noted that a variety of bit depths for the line scan camera 615 can be employed for use with a fluorescence scanner embodiment of the scanning system 550.

The movable stage 580 is configured for precise X-Y movement under control of the processor 555 or the motion controller 570. The movable stage may also be configured for Z movement under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity, and then maintain the substantially constant velocity during image data capture by the line scan camera 615. In an embodiment, the scanner system 550 may employ a high-precision and tightly coordinated X-Y grid to aid in the location of the sample 590 on the movable stage 580. In an embodiment, the movable stage 580 is a linear-motor-based X-Y stage with high-precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 (e.g., corresponding to sample 210) can be anything that may be interrogated by optical microscopy. For example, a glass microscope slide 585 (e.g., corresponding to slide 200) is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, or machined parts.

Objective lens 600 is mounted on the objective positioner 630, which, in an embodiment, employs a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in X, Y, and/or Z axes are coordinated and controlled in a closed-loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission-mode illumination microscopy, reflection-mode illumination microscopy, and/or epi-illumination-mode fluorescence microscopy (e.g., an Olympus 40×, 0.75NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens 600 becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600, combined with the focusing optics 610, provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the other line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored in a portion of the memory 565 and processed by the one or more processors 555 to generate focus information, to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined together to form a contiguous digital image of a portion or the entire sample 590. The scanning of the sample 590 may include acquiring vertical image stripes or horizontal image stripes. The scanning of the sample 590 may be either top-to-bottom, bottom-to-top, or both (bi-directional), and may start at any point on the sample. Alternatively, the scanning of the sample 590 may be either left-to-right, right-to-left, or both (bi-directional), and may start at any point on the sample. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer-executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 5B:
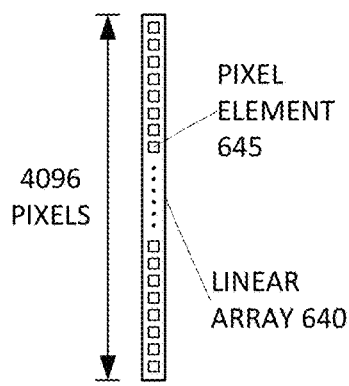
FIG. 5B is a block diagram illustrating an example line scan camera having a single linear array, according to an embodiment.

FIG. 5B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view 625 varies in accordance with the magnification of the scanner system 550.

Figure 5C:
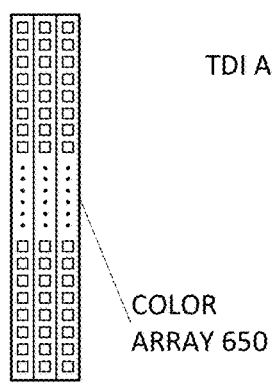
FIG. 5C is a block diagram illustrating an example line scan camera having three linear arrays, according to an embodiment.

FIG. 5C illustrates a line scan camera having three linear arrays, each of which may be implemented as a CCD array. The three linear arrays combine to form a color array 650. In an embodiment, each individual linear array in the color array 650 detects a different color intensity, for example, red, green, or blue. The color image data from each individual linear array in the color array 650 is combined to form a single field of view 625 of color image data.

Figure 5D:
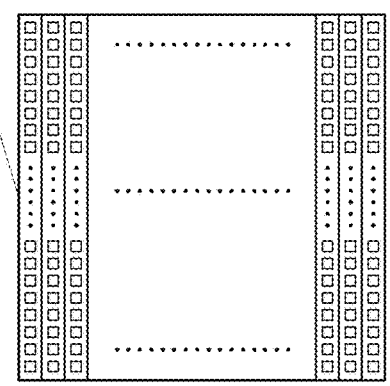
FIG. 5D is a block diagram illustrating an example line scan camera having a plurality of linear arrays, according to an embodiment.

FIG. 5D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A digital scanning apparatus comprising:
an objective lens;
at least one sensor positioned in an optical path of the objective lens and configured to sense a field of view of the objective lens; and
at least one processor configured to:
adjust a height of the objective lens during scanning of a sample, and
for each of a plurality of regions of the sample to be scanned:
determine a predicted objective lens distance Z value for the region based on a stored objective lens distance Z value that is associated with a location that is nearest to the location of the region than any other location that is associated with any stored objective lens distance Z value, wherein each stored objective lens distance Z value represents a distance between the objective lens and the sample that provides best focus at the associated location,
at a start of scanning the region, adjust a distance between the objective lens and the sample based on the predicted objective lens distance Z value,
scan the region to acquire a buffer of image data,
based on the buffer of image data, determining an objective lens distance Z value that represents a distance between the objective lens and the sample that provides best focus for the region after scanning the region, and
store the objective lens distance Z value, determined for the region, in association with a location on the sample.

2. The apparatus of claim 1, wherein the at least one processor of the digital scanning apparatus is further configured to, for each of the plurality of regions of the sample to be scanned:
after determining the objective lens distance Z value for the region, determine a difference between the objective lens distance Z value for the region and the predicted objective lens distance Z value for the region; and,
when the difference exceeds a predetermined threshold, initiating a rescan of the region.

3. The apparatus of claim 2, wherein the at least one processor of the digital scanning apparatus is further configured to, after scanning the plurality of regions:
determine whether or not the difference between the objective lens distance Z value and the predicted objective lens distance Z value exceeds the predetermined threshold for a predetermined percentage of the scanned plurality of regions; and,
when determining that the difference between the objective lens distance Z value and the predicted objective lens distance Z value exceeds the predetermined threshold for the predetermined percentage of the scanned plurality of regions, initiate a rescan of the entire sample.

4. The apparatus of claim 2, wherein the predetermined threshold is within a range of 0.5 microns to 0.9 microns.

5. The apparatus of claim 1, wherein the at least one processor of the digital scanning apparatus is further configured to, when determining an objective lens distance Z value that represents a distance between the objective lens and the sample that provides best focus for a respective region, determine a distance between the objective lens and the sample that is associated with a peak contrast value from the respective buffer, wherein the at least one sensor comprises a focusing sensor with one or more linear arrays, wherein each of the one or more linear arrays is tilted such that each pixel in the linear array is in a different image plane, and wherein the at least one processor of the digital scanning apparatus is further configured to, when determining a distance between the objective lens and the sample that is associated with a peak contrast value from the respective buffer:
for each of a plurality of columns of pixels in the respective buffer, calculate an average contrast value;
identify the peak contrast value as a highest one of the determined average contrast values; and
determine the distance between the objective lens and the sample that is associated with the column of pixels for which the highest average contrast value was calculated,
wherein each average contrast value is an average contrast ratio value.

6. The apparatus of claim 1, wherein:
the at least one processor of the digital scanning apparatus is further configured to calculate a global sample surface using all of the stored objective lens distance Z values, wherein the predicted objective lens distance Z value for each of the plurality of regions is further based on the global sample surface,
the at least one processor of the digital scanning apparatus is further configured to, after scanning each of the plurality of regions, recalculate the global sample surface using the objective lens distance Z value determined for that region, and
the at least one processor of the digital scanning apparatus is further configured to continually update the global sample surface as new objective lens distance Z values are determined and stored, to reflect all stored objective lens distance Z values for the sample.

7. The apparatus of claim 1, wherein the at least one processor of the digital scanning apparatus is further configured to, for each of one or more of the plurality of regions, calculate a local sample surface using objective lens distance Z values determined for at least a subset of neighboring regions of the sample, wherein the predicted objective lens distance Z value for the region is further based on the local sample surface, wherein the at least one processor of the digital scanning apparatus is further configured to, for each of the plurality of regions:
when an objective lens distance Z value has not been calculated for any neighboring regions, determine the predicted objective lens distance Z value for the region based on the stored objective lens distance Z value that is associated with the location that is nearest to the location of the region than any other location that is associated with any stored objective lens distance Z value, and not based on any local sample surface; and, when an objective lens distance Z value has been calculated for neighboring regions such that a local sample surface is calculated, determine the predicted objective lens distance Z value for the region further based on the local sample surface.

8. The apparatus of claim 1, wherein the at least one processor of the digital scanning apparatus is further configured to, prior to scanning the plurality of regions:
select at least one macro-focus point on the sample;
acquire image data comprising the macro-focus point at a plurality of image planes corresponding to a plurality of distances between the objective lens and the sample;
determine a objective lens distance Z value that represents a distance between the objective lens and the sample that provides best focus for the macro-focus point; and
store the objective lens distance Z value, determined for the macro-focus point, in association with a location of the macro-focus point on the sample.

9. The apparatus of claim 8, wherein the at least one processor of the digital scanning apparatus is further configured to, when selecting at least one macro-focus point on the sample, select the at least one macro-focus point to be within a predetermined range from an edge of the sample.

10. The apparatus of claim 9, wherein the at least one processor of the digital scanning apparatus is further configured to, when selecting at least one macro-focus point on the sample, select the at least one macro-focus point to be within the predetermined range from a line representing a maximum length across the sample, wherein the predetermine range is a radius or a range of the at least one sensor.

11. The apparatus of claim 8, wherein the plurality of distances comprise both a closest and farthest possible distance between the sample and the objective lens.

12. The apparatus of claim 1, wherein the at least one processor of the digital scanning apparatus is further configured to acquire and store objective lens distance Z values for a plurality of reference regions, along a line representing a maximum length across the sample to be scanned, prior to scanning any of the plurality of regions.

13. A method for focusing a digital scanning apparatus that comprises an objective lens, at least one sensor positioned in an optical path of the objective lens to sense a field of view of the objective lens, and at least one processor, the method comprising, by the at least one processor of the digital scanning apparatus, for each of a plurality of regions of a sample to be scanned:
determining a predicted objective lens distance Z value for the region based on a stored objective lens distance Z value that is associated with a location that is nearest to the location of the region than any other location that is associated with any stored objective lens distance Z value, wherein each stored objective lens distance Z value represents a distance between the objective lens and the sample that provides best focus at the associated location;
at a start of scanning the region, adjusting a distance between the objective lens and the sample based on the predicted objective lens distance Z value;
scanning the region to acquire a buffer of image data; and,
after scanning the region, based on the buffer of image data, determining an objective lens distance Z value that represents a distance between the objective lens and the sample that provides best focus for the region, and
storing the objective lens distance Z value, determined for the region, in association with a location on the sample.

14. A non-transitory computer-readable medium having stored thereon instruction that, when executed by a hardware processor, cause the hardware processor to:
adjust a height of an objective lens during scanning of a sample using at least one sensor, the at least one sensor positioned in an optical path of the objective lens and configured to sense a field of view of the objective lens, and
for each of a plurality of regions of the sample to be scanned:
determine a predicted objective lens distance Z value for the region based on a stored objective lens distance Z value that is associated with a location that is nearest to the location of the region than any other location that is associated with any stored objective lens distance Z value, wherein each stored objective lens distance Z value represents a distance between the objective lens and the sample that provides best focus at the associated location,
at a start of scanning the region, adjust a distance between the objective lens and the sample based on the predicted objective lens distance Z value,
scan the region to acquire a buffer of image data,
based on the buffer of image data, determine an objective lens distance Z value that represents a distance between the objective lens and the sample that provides best focus for the region after scanning the region, and
store the objective lens distance Z value, determined for the region, in association with a location on the sample.

15. The non-transitory computer-readable medium of claim 14, wherein the instructions are further configured to cause the hardware processor to, for each of the plurality of regions of the sample to be scanned:
after determining the objective lens distance Z value for the region, determine a difference between the objective lens distance Z value for the region and the predicted objective lens distance Z value for the region; and,
when the difference exceeds a predetermined threshold, initiating a rescan of the region.

16. The non-transitory computer-readable medium of claim 15, wherein the instructions are further configured to cause the hardware processor to, after scanning the plurality of regions:
determine whether or not the difference between the objective lens distance Z value and the predicted objective lens distance Z value exceeds the predetermined threshold for a predetermined percentage of the scanned plurality of regions; and,
when determining that the difference between the objective lens distance Z value and the predicted objective lens distance Z value exceeds the predetermined threshold for the predetermined percentage of the scanned plurality of regions, initiate a rescan of the entire sample.

17. The non-transitory computer-readable medium of claim 14, wherein the instructions are further configured to cause the hardware processor to, when determining an objective lens distance Z value that represents a distance between the objective lens and the sample that provides best focus for a respective region, determine a distance between the objective lens and the sample that is associated with a peak contrast value from the respective buffer.

18. The non-transitory computer-readable medium of claim 14, wherein the at least one sensor comprises a focusing sensor with one or more linear arrays, wherein each of the one or more linear arrays is tilted such that each pixel in the linear array is in a different image plane, and wherein the instructions are further configured to cause the hardware processor to, when determining a distance between the objective lens and the sample that is associated with a peak contrast value from the respective buffer:
- for each of a plurality of columns of pixels in the respective buffer, calculate an average contrast value;
- identify the peak contrast value as a highest one of the determined average contrast values; and
- determine the distance between the objective lens and the sample that is associated with the column of pixels for which the highest average contrast value was calculated, wherein each average contrast value is an average contrast ratio value.

19. The non-transitory computer-readable medium of claim 14, wherein the instructions are further configured to cause the hardware processor to calculate a global sample surface using all of the stored objective lens distance Z values, wherein the predicted objective lens distance Z value for each of the plurality of regions is further based on the global sample surface.

20. The non-transitory computer-readable medium of claim 19, wherein the instructions are further configured to cause the hardware processor to, after scanning each of the plurality of regions, recalculate the global sample surface using the objective lens distance Z value determined for that region, and wherein the hardware processor is further configured to continually update the global sample surface as new objective lens distance Z values are determined and stored, to reflect all stored objective lens distance Z values for the sample.

* * * * *